United States Patent [19]

Hikasa et al.

[11] Patent Number: 5,516,582
[45] Date of Patent: May 14, 1996

[54] MULTILAYER MOLDED ARTICLE AND METHOD FOR PRODUCING THE SAME

[75] Inventors: Tadashi Hikasa, Sodegaura; Hiroaki Mendori, Ichihara; Takahisa Hara; Nobuhiro Usui, both of Osaka, all of Japan

[73] Assignee: Sumitomo Chemical Co., Ltd., Osaka, Japan

[21] Appl. No.: 729,196

[22] Filed: Jul. 12, 1991

[30] Foreign Application Priority Data

Jul. 13, 1990 [JP] Japan ................................. 2-185931

[51] Int. Cl.$^6$ .............................. B32B 27/00; B28B 5/00
[52] U.S. Cl. ........................................ 428/319.9; 264/241
[58] Field of Search ............................ 428/319.9, 319.7, 428/319.3; 264/241

[56] References Cited

U.S. PATENT DOCUMENTS

| | | | |
|---|---|---|---|
| 4,873,041 | 10/1989 | Masui et al. | 264/135 |
| 4,917,944 | 4/1990 | Breitscheidel et al. | 428/308.4 |
| 4,997,707 | 3/1991 | Otawa et al. | 428/319.3 |

FOREIGN PATENT DOCUMENTS

| | | |
|---|---|---|
| 0186016 | 7/1986 | European Pat. Off. . |
| 0331447 | 9/1989 | European Pat. Off. . |
| 0360577 | 3/1990 | European Pat. Off. . |
| 59-159342 | 9/1984 | Japan . |
| 63-162214 | 7/1988 | Japan . |
| 64-022545 | 1/1989 | Japan . |
| 64-061214 | 3/1989 | Japan . |
| 2206835 | 1/1989 | United Kingdom . |

*Primary Examiner*—Christopher W. Raimund
*Attorney, Agent, or Firm*—Birch, Stewart, Kolasch & Birch

[57] ABSTRACT

A multilayer molded article having a body of a thermoplastic resin and a skin material which is laminated on a surface of said body and made of an olefin thermoplastic elastomer having 100% modulus (M100) at 23° C. of from 20 to 60 kg/cm$^2$ and a frictional resistance (tan δ) against a metal surface of 1.0 or lower which is backed with a foam layer, which has good appearance and also good weather resistance.

4 Claims, 1 Drawing Sheet

MULTILAYER MOLDED ARTICLE AND METHOD FOR PRODUCING THE SAME

BACKGROUND OF THE INVENTION

1. Field of the Invention

The present invention relates to a multilayer molded article and a method for producing the same. In particular, the present invention relates to a thermoplastic resin molded article having a skin material layer, which article has good appearance and is used as an automobile interior panel or electric appliances, and a method for producing such molded article.

2. Description of the Related Art

There are widely known high-grade molded articles which have improved beauty and softness by laminating a skin material thereon. As the skin material, a film or sheet of soft polyvinyl chloride or a thermoplastic elastomer which is backed with a foam layer of polyolefin or polyurethane resin to give a cushioning effect is used.

As a method for producing a multilayer molded article having a skin material, there is a method comprising forming a molded article of a thermoplastic resin by a conventional molding method such as injection molding and then forming the skin material on the molded article by, for example, vacuum molding, or simultaneously forming the molded article and the skin material with laminating the skin material to the article with an adhesive.

Alternatively, the multilayer molded article can be produced by placing the skin material in a mold, closing the mold, then injecting a molten thermoplastic resin in a mold cavity through a gate of the mold to laminate the resin with the skin material, cooling the mold and opening the mold to remove the molded article.

However, each of the above methods has its own drawbacks.

Since the polyvinyl chloride skin material has a comparatively large specific gravity and also poor weather resistance, when it is used as a skin material of an article to be used in direct rays of the sun, its surface appearance is greatly deteriorated. Since polyvinyl chloride is softened by the addition of a large amount of a plasticizer, when it is used as the automobile interior panel, it will cloud a front glass due to the influence of the plasticizer. Since polyvinyl chloride will generate hydrogen chloride gas when it is burnt because of the presence of chlorine atoms in its chemical structure, it cannot be destroyed by burning in view of environmental pollution, or it will corrode various processing apparatuses.

Though the thermoplastic elastomer does not have the above drawbacks of polyvinyl chloride when used as the skin material, it is easily flawed so that the appearance is gradually deteriorated as the article is used.

With respect to the production method, the method utilizing the adhesive is complicated so that the molded article becomes expensive. In addition, a solvent, a dispersant and the like used in the adhesive tend to pollute the environment. In the injection molding method, since the resin melt is injected in the closed mold so that the resin melt at high temperature and high pressure contacts to the skin material and presses the skin material to the mold wall strongly, the surface of the skin material is discolored and designs of the skin material are deformed, so that the appearance of the molded article is deteriorated. When the skin material backed with the foam layer is used, the foam layer is crushed or damaged by the same reason, so that the cushioning effect and appearance of the molded article are decreased. When the thermoplastic elastomer is used as the skin material, such defective moldings are often found.

To prevent such defective appearance of the molded article, it is proposed to wet the surface of the skin material (cf. Japanese Patent Kokai Publication No. 61214/1989), or to suppress increase of a temperature or a degree of deformation of the skin sheet by increasing a tensile strength of a backing material (cf. Japanese Patent Kokai Publication Nos. 159342/1984 and 22545/1989).

However, further processing of the already prepared skin material such as wetting of the skin material adds one processing step to the production method and increases a production cost. To increase the tensile strength of the skin material, it is contemplated to increase a thickness of the backing material, to bond an additional discrete sheet to the skin material, or decrease an expansion ratio of the foam layer. However, these measures will increase material costs. Further, because the skin material is placed between upper and lower molds, if the same molds used before the increase of the skin material thickness are used in molding, a distance between the upper and lower molds is increased by the use of the thicker skin material, so that a larger amount of the resin melt should be supplied in the mold cavity so as to fill every corner of the mold cavity. Therefore, to produce a satisfactory multilayer molded article, an amount of the thermoplastic resin or the pressure for molding should be increased. As a result, the material cost or a weight of the produced article increases, or the appearance of the article may be deteriorated. If the mold design is modified or changed to overcome such a problem, a cost for such modification is required.

In the mold cavity in which the material is influenced by heat, pressure or stretching, the skin material which is backed with the foam layer and has an outermost layer of the thermoplastic elastomer sheet suffers from excessive deformation of the foam layer, so that the foam layer is crushed, whereby the appearance of the molded article is deteriorated or the skin material is broken.

SUMMARY OF THE INVENTION

In view of the above problems, as a result of extensive study, the present inventors have found that, the crush of the foam layer is prevented and the multilayer molded article having good appearance and soft feeling can be produced by using, as an outermost layer of the skin material, a thermoplastic elastomer sheet having a high tensile strength and a small frictional resistance against a metal surface such as a metal mold, and have completed the present invention.

Accordingly, the present invention provides a multilayer molded article produced by placing, between unclosed male and female molds, a skin material comprising an olefin thermoplastic elastomer having 100% modulus (M100) at 23° C. of from 20 to 60 kg/cm$^2$ and a frictional resistance (tan δ) against a metal surface of 1.0 or lower which is backed with a foam layer, supplying a thermoplastic resin melt between said foam layer and either of said male and female molds, and closing said male and female molds to integrally bond said skin material and said thermoplastic resin, and a method for producing the same.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE DRAWINGS

Figure 1:
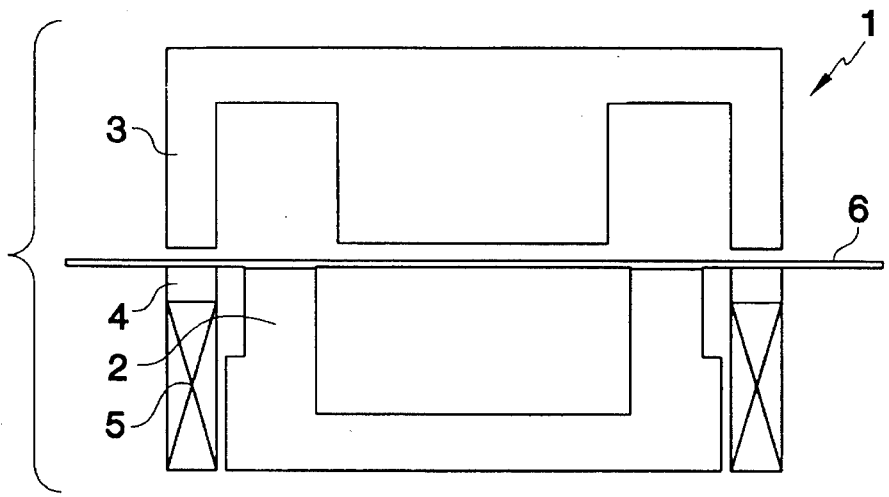
FIGS. 1 to 3 are cross sections of the apparatus in various steps of the method of the present invention.

The olefin thermoplastic elastomer to be used as the skin material in the present invention includes a dynamic cross-linked material of an olefin rubber such as an ethylene-propylene rubber, an ethylene-propylene-diene terpolymer and the like and an olefin resin, or a blend of such dynamic cross-linked material and an olefin resin such as polyethylene, polypropylene and the like. A composition of such material or blend optionally containing various additives, compounding agents, pigments, softeners and the like is formed in a sheet by calendering or extrusion molding. The foam layer to be used as a backing material of the sheet form thermoplastic elastomer is a foam of a polyolefin resin. The backing foam layer may be laminated on the thermoplastic elastomer while producing the thermoplastic elastomer sheet by a T-die sheet manufacturing apparatus.

The tensile strength, namely 100% modulus at 23° C. (M100) of the thermoplastic elastomer to be used as the outermost layer is preferably from 20 to 60 kg/cm$^2$, and the frictional resistance (tan δ) is preferably 1.0 or less. When M100 is less than 20 kg/cm$^2$, the skin material has too little strength against stretching so that the foam layer is excessively deformed and crushed, and as a result, the appearance tends to be deteriorated. When M100 is larger than 60 kg/cm$^2$, the skin material is hardly deformed because of too much strength and excessively tugged in the mold so that the skin material tends to wrinkle.

When tan δ is larger than 1.0, a sliding resistance against the mold is too large and the skin material is hardly tugged in the mold, so that, as in the case of M100 of smaller than 20 kg/cm$^2$ the appearance tends to be deteriorated due to excessive deformation of the foam layer.

When the tensile strength is unnecessarily large or the frictional resistance is unnecessarily small, the skin material sheet is easily tugged in the mold excessively, so that the wrinkles tend to be formed on the skin layer as explain above. Then, more preferably, the thermoplastic elastomer has M100 of from 20 to 40 kg/cm$^2$ and tan δ of from 0.5 to 1.0.

To improve flaw resistance or a slip property, a film of an abrasion resistant resin such as a polyurethane or acrylic resin and engineering plastics is laminated on the sheet surface though bonding or with an adhesive, or the abrasin resistant resin is applied as a coating agent to the sheet surface. The coating agent may be applied to the surface of the article after molding.

As the thermoplastic resin in the present invention, any thermoplastic resin which is conventionally used in compression molding, injection molding or extrusion may be used. Examples of the thermoplastic resin are polyethylene resins such as high density polyethylene, polypropylene, copolymers comprising propylene, ABS resins, styrene base resins, polyamide resins, polyester resins, polymer alloys, or mixtures thereof.

To the thermoplastic resin, various fillers such as organic fillers or glass fibers, and various additives such as pigments, lubricants, antistatic agents or stabilizers may be added, if desired.

The present invention will be explained by making reference to the accompanying drawings.

In the present invention, (1) The skin material having the thermoplastic elastomer sheet as the outermost layer in a continuous sheet form or after cut to a suitable size is placed on a skin material-fixing frame 4 (FIG. 1).

Figure 2:
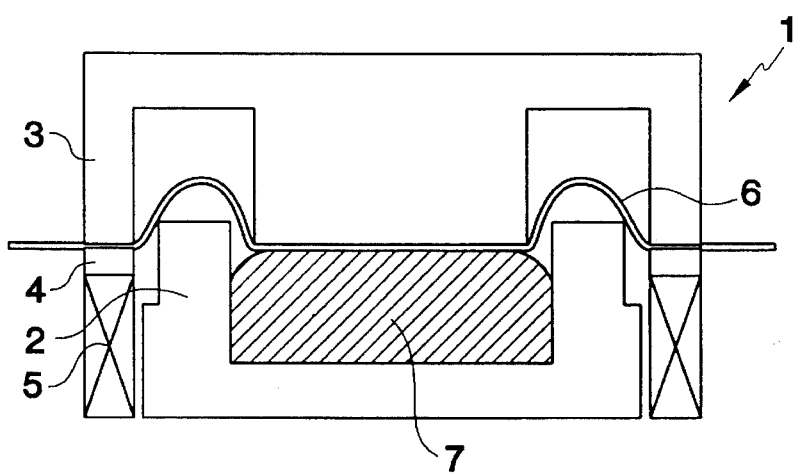

(2) Then, a female mold 3 is lowered, and the skin material is held between the skin material-fixing frame 4 and the female mold 3 with a suitable clamping force. Thereafter, a resin melt 7 is supplied between the skin material and a male mold while the female mold 3 and the male mold 2 are still opened (FIG. 2). When the skin material is held, a telescopic apparatus 5 contracts and the skin material-fixing frame 4 lowers. The resin melt is supplied through a passage for resin melt (not shown) formed in the male mold.

(3) When a lifting mechanism (not shown) is actuated to lower the female mold 3 and the skin material-fixing frame 4, the resin melt 7 flows to press the skin material 6 against the female mold 3, whereby the skin material is tugged in concaves of the female mold while a peripheral part of the skin material slides between the skin material-fixing frame 4 and the female mold 3 and the skin material is expanded.

Figure 3:
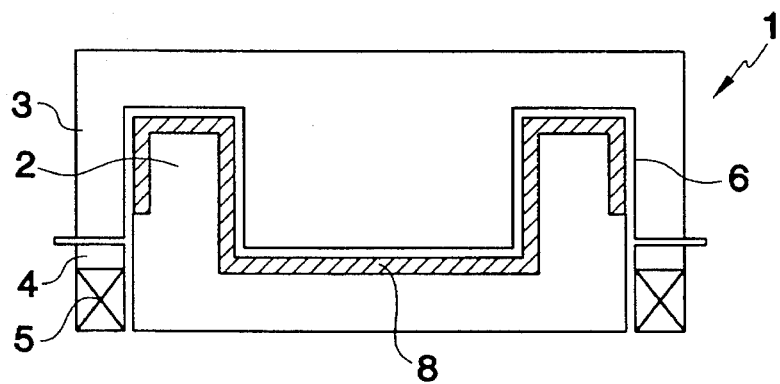

(4) As the female mold 3 further lowers, the male and female molds 2, 3 are completely closed, the skin material 6 and the thermoplastic resin 8 are integrated together, and the molding is finished (FIG. 3).

(5) After cooling, the female mold 3 is lifted, and the multilayer molded article comprising the skin material 6 and thermoplastic resin 8 which are integrally laminated are removed.

In the present invention, usually, the skin material having a thickness of 0.3 to 1.2 mm is placed between the unclosed male and female molds at a temperature of 20° to 60° C., the melt of the thermoplastic resin heated at a temperature of 180° to 230° C. is supplied on the foam layer side of the skin material, the molds are closed, and the resin and the skin materials are molded under a pressing pressure of 20 to 150 kg/cm$^2$. Thereby, the laminated molded article excellent in surface appearance and softness of the skin material is produced.

The above description illustrates an example of the molding method of the present invention, and preheating of the skin material, presence or absence of premolding, positions of the male and female molds, presence or absence of the skin material-fixing frame, a manner for supplying the resin melt or a mold design for treating edge parts can be freely selected within the scope of the present invention.

EXAMPLES

To explain the present invention in further detail, Examples will be presented. In Examples, the properties are measured by the following methods:

(1) Among the tensile properties, modulus at 100% elongation (M100) is measured according to JIS K 6301.

(2) Frictional resistance

Using a frictional angle measuring apparatus (manufactured by Toyo Seiki), a chrome-plated metal weight of 1 kg having a length of 6.3 cm, a width of 10.0 cm and a height of 1.9 cm is placed on a skin material sheet, and an angle ($\delta$) at which the metal weight starts to slide is measured. The frictional resistance is expressed in terms of tan $\delta$. The smaller tan $\delta$ means smaller frictional resistance.

EXAMPLE 1

In a Mixtron BB-16 (manufactured by Kobe Steel, Ltd.), 70 parts by weight of an oil-extended EPDM rubber (Mooney viscosity ($ML_{1+4}$ 100° C.)=78) which consisted of 100 parts by weight of an ethylene-propylene-ethylidenenorbornene copolymer rubber (propylene content: 30% by weight, iodine value: 10) and 40 parts by weight of a mineral oil base softener (Dynaprocess (a trade mark) PW 380 manufactured by Idemitsu Kosan), 30 parts by weight of random polypropylene (ethylene content: 5% by weight, MFR (230° C., 2.16 kg)=1.3 g/10 min.) and 0.4 part by weight of a cross-linking aid (Sumifine BM (a trade mark) manufactured by Sumitomo Chemical Co., Ltd.) were mixed for 10 minutes and extruded to produce a particulate composition. To 100 parts by weight of the composition, 0.04 part by weight of 2,5-dimethyl-2,5-di-tert.-butylperoxyhexane was added and dynamically cross linked at 220° C. for one minute with a twin-screw extruder (TEX-44 manufactured by Nippon Seikosho) to prepare a thermoplastic elastomer. The properties of the thermoplastic elastomer were as follows:

$M100=32$ kg/cm$^2$, tan $\delta=0.8$.

When the thermoplastic elastomer was T-die extruded with an extruder of 40 mm in diameter to form a sheet having a thickness of 0.6 mm, a polyolefin resin foam sheet (PPSM 15030 manufactured by Toray) was thermocompression bonded to one surface of the sheet to produce a two layer sheet.

As a skin material, this sheet was placed in the unclosed mold with the foam layer facing downwards, and polypropylene (Sumitomo Noblen AZ 564 manufactured by Sumitomo Chemical Co., Ltd.) which had been molten and plasticized at 200° C. through a resin passage provided in the lower mold. Thereafter, the mold was closed to effect molding of the resin. The molded article had no appearance defects due to crush of the foam layer, and a good quality multilayer article was obtained.

Comparative Example 1

Under the same conditions and using the same materials as in Example 1 except that 80 parts by weight of an oil-extended EPDM rubber (Mooney viscosity ($ML_{1+4}$ 100° C.)= 53) which consisted of 100 parts by weight of an ethylene-propylene-ethylidenenorbornene copolymer rubber (propylene content: 28% by weight, iodine value: 12) and 100 parts by weight of the mineral oil base softener (Dynaprocess (a trade mark) PW 380 manufactured by Idemitsu Kosan) and 20 parts by weight of random polypropylene were used, a thermoplastic elastomer was prepared. The properties of the thermoplastic elastomer were as follows:

$M100=20$ kg/cm$^2$, tan $\delta=1.2$.

In the same manner as in Example 1 but using this thermoplastic elastomer, a skin material was produced and a multilayer article was molded under the same conditions. The molded article had appearance defects due to crush of the foam layer at parts where the shape change was large.

Comparative Example 2

Under the same conditions and using the same materials as in Example 1 except that 40 parts by weight of the oil-extended EPDM rubber, 20 parts by weight of random polypropylene and 40 parts by weight of an ethylene-propylene copolymer rubber (propylene content: 53% by weight, Mooney viscosity ($ML_{1+4}$ 100° C.)=43) were used, a thermoplastic elastomer was prepared. The properties of the thermoplastic elastomer were as follows:

$M100=17$ kg/cm$^2$, tan $\delta=1.8$.

In the same manner as in Example 1 but using this thermoplastic elastomer, a skin material was produced and a multilayer article was molded under the same conditions. As in Comparative Example, 1, the molded article had appearance defects due to crush of the foam layer at parts where the shape change was large.

EXAMPLE 2

A mixture of 85 parts by weight of the same thermoplastic elastomer as used in Example 1 and 15 parts by weight of random polypropylene (ethylene content: 4.5% by weight, MFR (230° C., 2.16 kg)=1.3 g/10 min.) was kneaded and extruded at 220° C. with an extruder of 65 mm in diameter to produce particulate thermoplastic elastomer. The properties of the thermoplastic elastomer were as follows:

$M100=48$ kg/cm$^2$, tan $\delta=0.6$.

In the same manner as in Example 1 but using this thermoplastic elastomer and changing the thickness to 0.4 mm, a skin material sheet was produced and a multilayer article was molded under the same molding conditions as in Example 1. As in Example 1, the molded article had no defects such as crush of the foam layer, and its quality was good.

Comparative Example 3

In a Mixtron BB-16 (manufactured by Kobe Steel, Ltd.), 77 parts by weight of an ethylene-propylene-ethylidenenorbornene copolymer rubber (propylene content: 50% by weight, iodine value: 8, Mooney viscosity ($M_{1+4}$ 100° C.)= 84), 19 parts by weight of homopolypropylene (MFR (230° C., 2.16 kg)=4 g/10 min.) and 4 parts by weight of the mineral oil base softener (Dynaprocess (a trade mark) PW 380 manufactured by Idemitsu Kosan) were mixed for 10 minutes and extruded to produce a particulate composition. To 100 parts by weight of the composition, 0.3 part by weight of 2,5-dimethyl-2,5-di-tert.-butylperoxyhexane was added and dynamically cross linked at 220° C. for one minute with the twin-screw extruder (TEX-44 manufactured by Nippon Seikosho). To 85 parts by weight of this cross linked material, 15 parts by weight of random polypropylene (ethylene content: 5% by weight, MFR (230° C., 2.16 kg)=1.3 g/10 min.) was added and kneaded at 220° C. and extruded with an extruder of 65 mm in diameter to produce a particulate thermoplastic elastomer. The properties of the thermoplastic elastomer were as follows:

M100=67 kg/cm², tan δ=0.5.

In the same manner as in Example 1 but using this thermoplastic elastomer, a skin material sheet was produced and a multilayer article was molded under the same conditions as in Example 1. The molded article had wrinkles generated by excessive tugging of the skin material into the mold, and molding result was not good.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multilayer molded article comprising a body of a thermoplastic resin and a skin material which is laminated on a surface of said body, the skin material comprises an olefin thermoplastic elastomer having 100% modulus (M100) at 23° C. of from 20 to 60 kg/cm² and a frictional resistance (tan δ) against a metal surface of 1.0 or lower, the skin material is backed with a polyolefin foam layer.

2. The multilayer molded article according to claim 1, wherein M100 of said thermoplastic elastomer is from 20 to 40 kg/cm².

3. The multilayer molded article according to claim 1, wherein tan δ of said thermoplastic elastomer is from 0.5 to 1.0.

4. A method for producing a multilayer molded article which comprises placing, between unclosed male and female molds, a skin material, the skin material comprising an olefin thermoplastic elastomer having 100% modulus (M100) at 23° C. of from 20 to 60 kg/cm² and a frictional resistance (tan δ) against a metal surface of 1.0 or lower, the skin material is backed with a polyolefin foam layer, supplying a thermoplastic resin melt between said polyolefin foam layer and either of said male and female molds, and closing said male and female molds to integrally bond said skin material and said thermoplastic resin.

* * * * *